(12) United States Patent
Yasui

(10) Patent No.: US 6,989,919 B2
(45) Date of Patent: Jan. 24, 2006

(54) SCANNING APPARATUS

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/768,657

(22) Filed: Feb. 2, 2004

(65) Prior Publication Data
US 2004/0233497 A1 Nov. 25, 2004

(30) Foreign Application Priority Data
May 29, 2003 (JP) ............................ 2003-152627

(51) Int. Cl.
*G02B 26/02* (2006.01)

(52) U.S. Cl. ...................... 359/224; 359/872

(58) Field of Classification Search ............... 359/223, 359/224, 225, 226, 871–876
See application file for complete search history.

(56) References Cited

U.S. PATENT DOCUMENTS 5,841,579 A * 11/1998 Bloom et al. ............... 359/224

FOREIGN PATENT DOCUMENTS

| JP | 03-215812 A | 9/1991 |
|---|---|---|
| JP | 06139386 A | 5/1994 |
| JP | 06-331908 A | 12/1994 |
| JP | 07-306367 A | 11/1995 |
| JP | 2000-019446 A | 1/2000 |

* cited by examiner

Primary Examiner—Euncha P. Cherry
(74) Attorney, Agent, or Firm—Sughrue Mion, PLLC

(57) ABSTRACT

A scanning apparatus (100) ensuring a smooth swinging movement of a deflector with a simple and compact structure includes a flat plate-like elastic member (11) having both end portions fixedly secured in a state in which an intermediate portion of the elastic member (11) is flexed arcuately, a deflector (12) fixedly secured onto the elastic member (11) at the intermediate portion thereof for changing a direction of a wave propagation coming from a predetermined direction, and a driving means (14) for reciprocatively rotating the deflector (12) by changing repetitionally magnitude of flexure of the elastic member (11) relative to the deflector (12) fixedly secured onto the elastic member (11).

8 Claims, 2 Drawing Sheets

SCANNING APPARATUS

BACKGROUND OF THE INVENTION

1. Field of the Invention

The present invention relates to a scanning apparatus for scanning objects with a wave propagation beam such as a laser beam, an electromagnetic wave beam, an acoustic wave beam or the like.

2. Description of Related Art

There is known heretofore a scanning apparatus of the structure mentioned below. That is, a scanning mechanism for a scanner for reading a bar code located at a distant position by scanning the bar code transversely with a light beam, wherein the scanning mechanism is comprised of a mirror for angularly displacing or deflecting the light beam so that the bar code can be scanned with the light beam, and a plate spring which supports the mirror reciprocatively rotatably or swingably. To this end, the plate spring is bent in a chevron-like form with the mirror being fixedly secured at the bent portion of the chevron-like plate spring.

By applying a force to a planar or flat portion on one side of the chevron-like plate spring by means of an electromagnet, the mirror is reciprocatively rotated or swung. By selecting the position of a split pin defining the center of rotation or swinging of the mirror so as not to coincide with the point of application of the force applied to the plate spring by the electromagnet, the force of the electromagnet is converted into reciprocative rotating or swinging efforts. For more particulars, reference may be made to, for example, Japanese Patent Application Laid-Open Publication No. 139836/1994(JP-A-6-139836).

In the scanning apparatus known heretofore, the plate spring bent in the chevron-like shape is made use of. In such plate spring, it is desirable that planar portions formed on both sides of the bent position be each of a perfect plane. In practice, however, it is difficult or impossible to realize the perfect plane in view of the limitation imposed to the manufacturing precision. Usually, the planar portion assumes such a shape that a mid portion bulges out three dimensionally more or less. When such plate spring undergoes a bending or flexing deformation, a shot-like discontinuous force will be generated upon flexing beyond the vicinity of a neutral position, which makes it difficult to realize a smooth vibratory or reciprocatively rotation or swinging of the deflector, giving rise to a problem.

Further, the bent portion is formed substantially at a center of the plate spring and the mirror is mounted at this position. Consequently, for realizing the scanning apparatus, there is demanded a press work of high precision, giving rise to another problem. Additionally, because the plate spring is shaped in the chevron-like form, an extraneous space is required for accommodation of the plate spring, i.e., the scanning apparatus can not be implemented in a small size as desired.

SUMMARY OF THE INVENTION

In the light of the state of the art described above, it is as an object of the present invention to provide a scanning apparatus which can ensure a smooth reciprocative rotation or swinging of the deflector with a simple and compact structure.

In view of the above and other objects which will become apparent as the description proceeds, there is provided according to a general aspect of the present invention a scanning apparatus which includes a flat plate-like elastic member having both end portions fixedly secured in a state in which an intermediate portion of the elastic member is flexed arcuately, a deflector fixedly secured onto the elastic member at the intermediate portion thereof for changing a direction of a wave propagation coming from a predetermined direction, and a driving means for reciprocatively rotating the deflector by changing repetitionally magnitude of flexure of the elastic member relative to the deflector fixedly secured onto the elastic member.

With the arrangement described above, there can be realized the scanning apparatus which can ensure a smooth scanning operation with a simple and compact structure.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
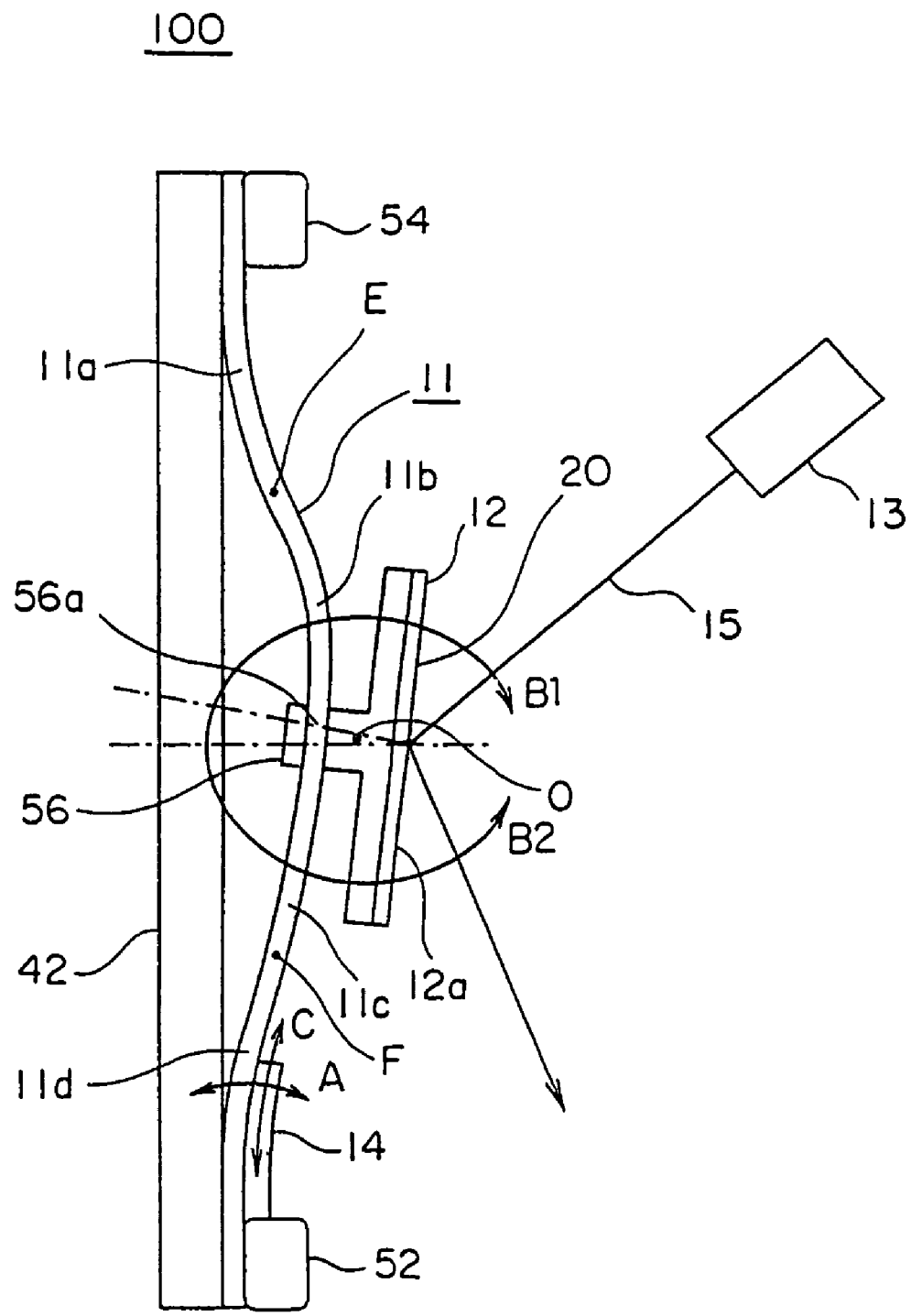
FIG. 1 is a side elevational view showing a scanning apparatus according to a first embodiment of the present invention.

The present invention will be described in detail in conjunction with what is presently considered as preferred or typical embodiments thereof by reference to the drawings. In the following description, like reference characters designate like or corresponding parts throughout the views.

Embodiment 1

FIG. 1 is a side elevational view showing the scanning apparatus according to a first embodiment of the present invention. The scanning apparatus 100 according to the instant embodiment of the invention is generally comprised of a plate spring 11 serving as a flat plate-like elastic member having both end portions fixedly secured with an intermediate portion of the plate spring 11 being bent arcuately, a mirror 12 serving as a light beam deflector supported on the plate spring 11 substantially at a center portion thereof, and a piezoelectric element 14 fixedly secured on the plate spring 11 to serve as a driving means for reciprocatively rotating or swinging the mirror 12 by changing repeatedly the magnitude of flexure of one half portion of the plate spring 11 relative to the mirror 12.

The plate spring 11 is implemented in an elongated thin plate-like member made of a spring steel and having a predetermined width. In the state where no stress is applied, the plate spring 11 assumes a flat plate-like shape. In the scanning apparatus according to the instant embodiment of the invention, the plate spring 11 is fixedly secured onto a holding member 42 by means of fixing members 52 and 54 with an intermediate portion of the plate spring 11 being flexed or curved arcuately. In this conjunction, it should be mentioned that corner portions of the fixing members 52 and 54 which are brought into contact with the plate spring 11 are arcuately chamfered so that essentially no concentrated stress is applied to the plate spring 11. In brief, the plate spring 11 is fixedly secured or held, being sandwiched between the fixing members 52 and 54 at both ends along the holding member 42.

There are formed in the plate spring 11 a first inflection point E and a second inflection point F at both sides, respectively, with reference to the mirror 12, wherein a first flexure portion 11a and a second flexure portion 11b flexing in opposite directions, respectively, are formed on both sides, respectively, of the first inflection point E, while a third flexure portion 11c and a fourth flexure portion 11d flexing in opposite directions, respectively, are formed on both sides, respectively, of the second inflection point F.

The second flexure portion 11b formed on the side near to the mirror 12 (center or mid portion of the plate spring 11) with reference to the first inflection point E is so curved or arcuately flexed that it becomes convex on the side where the mirror 12 is provided relative to the first inflection point. Similarly, the third flexure portion 11c formed on the side near to the mirror 12 (center or mid portion of the plate spring 11) with reference to the second inflection point F is so curved or arcuately flexed that it becomes convex on the side where the mirror 12 is provided relative to the second inflexion point F. On the other hand, the first flexure portion 11a formed on the side near to the fixing member 54 with reference to the first inflection point E is so curved or arcuately flexed that it becomes convex on the side opposite to the one where the mirror 12 is provided (i.e., toward the holding member 42 of the plate spring 11). Likewise, the fourth flexure portion 11d formed on the side near to the fixing member 52 with reference to the second inflection point F is so curved or arcuately flexed that it becomes convex on the side opposite to the one where the mirror 12 is provided (i.e., toward the holding member 42 of the plate spring 11).

In other words, referring to FIG. 1, the plate spring 11 is curved or arcuately flexed convexly toward the side of the holding member 42 (first flexure portion 11a), convexly toward the side of the mirror 12 (second flexure portion 11b) beyond the first inflection point E, convexly toward the supporting position of the mirror 12 and the mirror 12 (third flexure portion 11c), and convexly toward the holding member 42 (fourth flexure portion 11d) beyond the second inflection point F sequentially in this order, when viewed from the side of the fixing member 54.

Disposed in the vicinity of the center portion of the plate spring 11 is a supporting member 56 for supporting the mirror 12 on the plate spring 11. More specifically, the supporting member 56 supports the mirror 12 with a predetermined distance (displacement) outwardly from the center arcuate portion of the plate spring 11 so that the center of reciprocative rotary movement or swinging of the mirror 12 is positioned on the center of gravity (designated by "O") of the assembly 20 composed of the mirror 12 and the supporting member 56.

Bonded tightly to the plate spring 11 at an end portion adjacent to the fixing member 52 of the plate spring 11 is a main surface of the flat plate-like piezoelectric element 14 which is designed to serve as the driving means. The piezoelectric element 14 has electrodes on both major surfaces thereof, respectively. By applying an AC (alternating current) voltage between these electrodes, expansion and contraction (hereinafter also referred to as the expansion/contraction) of the piezoelectric element 14 in the longitudinal direction is effectuated repetitiously, as indicated by an arrow C in FIG. 1. Since one major surface of the piezoelectric element 14 is bonded to the plate spring 11, the curvature of the plate spring 11 changes repetitively as the expansion/contraction of the piezoelectric element 14 is repeated, as indicated by an arrow A in FIG. 1.

Now, description will be directed to the operation of the scanning apparatus according to the instant embodiment of the invention. When the AC voltage is applied to the piezoelectric element 14, as mentioned above, from a control circuit (not shown), the piezoelectric element 14 undergoes expansion and contraction in the longitudinal direction thereof, as indicated by the arrow A in FIG. 1. Although the magnitude itself of this expansion/contraction is small, it is possible to impart a significant displacement to the plate spring 11 owing to the bimorph effect (also termed simply bimorph) because the main surface of the plate spring 11 which does not undergo any expansion/contraction and that of the piezoelectric element 14 subjected to the expansion/contraction are bonded together in the structure shown in FIG. 1. When the piezoelectric element 14 is expanded or stretched, flexure or deformation of the portion of the plate spring 11 located closer to the fixing member 52 becomes small, as a result of which the mirror 12 rotates or swings in the clockwise direction, as indicated by an arrow B1 in FIG. 1. On the contrary, when the piezoelectric element 14 contracts, the mirror 12 rotates in the counterclockwise direction, as indicated by an arrow B2 in FIG. 1. In this conjunction, it is to be mentioned that by synchronizing the AC voltage mentioned above with the resonance of the rotational vibration of the system constituted by the plate spring 11, the mirror 12 and the supporting member 56, the amplitude of rotary or swing movement of the mirror 12 can remarkably be increased. Thus, it is possible to scan over a wide range with a laser beam 15 emitted from a semiconductor laser device 13.

Since the plate spring 11 is so flexed as to have the first and second inflection points E and F of mutually opposite directions on the both sides of the mirror 12, respectively, the whole portion except for the two inflection points E and F is flexed or curved convexly toward the mirror 12 or convexly toward the holding member 42. In other words, no straight portion exists in the plate spring 11. In general, the plate spring can exhibit a high rigidity in the direction orthogonal to the flexing direction, i.e., in the direction orthogonal to the plane of sheet of FIG. 1. For this reason, the thickness of the plate spring 11 can be decreased while preventing deflections in the direction orthogonal to the plane of sheet of FIG. 1.

By decreasing the thickness of the plate spring 11 in this manner, the plate spring 11 can be flexed with a large curvature without entering the region of plasticity. Thus, the scanning operation with the laser beam 15 can be achieved over a wide range. This also means that for a same scanning range, the length of the plate spring 11 can be shortened.

Further, it should be mentioned that a flat or planar plate flexed in a single direction (transverse direction as viewed in FIG. 1) such as the plate spring 11 can not bulge out three-dimensionally. Thus, there is no location in the plate spring where discontinuous force makes appearance to form a dimple portion, differing from the plate spring of the conventional scanning apparatus, to a great advantage.

When the mirror 12 is rotating or swinging in the clockwise direction as indicated by the arrow B1 in FIG. 1, magnitude of the flexure of the portion of the plate spring 11 on the side close to the fixing member 52 decreases. Consequently, a connecting portion 56a between the supporting member 56 and the plate spring 11 displaces more or less toward the fixing member 54. However, in the scanning apparatus according to the instant embodiment of the invention, the mirror 12 is displaced for a predetermined distance from the plate spring 11 so that the center of gravity "O" of the assembly unit 20 constituted by the mirror 12 and the supporting member 56 substantially coincides with the center of rotation. By virtue of this arrangement, the rotation moment becomes small, as a result of which the mirror 12 can rotatively be vibrated at a high frequency, whereby detrimental vibration components of the plate spring 11 in the longitudinal direction as well as in the flexing direction of the plate spring 11 can effectively be suppressed. Speaking strictly, however, since the vibration mode of the plate spring 11 is more or less susceptible to the deadweight of the plate spring 11, resistance of the air and others, it is preferred that the displacement of the mirror 12 should empirically be adjusted finely so that the detrimental or unwanted vibration can be suppressed to a minimum.

At this juncture, it is supposed, by way of example, that the holding member 42 is provided only at the locations facing oppositely the fixing members 52 and 54, respectively, i.e., the intermediate portion is absent in the holding member 42. In that case, there may arise such unwanted situation that the plate spring 11 will remarkably be deformed as a whole in the left direction as viewed in FIG. 1 when a large external force is applied to the plate spring 11 for moving the plate spring 11 to the left in FIG. 1. Such being the circumstances, the holding member 42 is provided over and along the whole left-hand surface of the plate spring 11 so as to function as a suppression member to prevent the convex deformation of the plate spring 11 in the left-hand direction as viewed in FIG. 1.

In the scanning apparatus 100 according to the instant embodiment of the present invention, the plate spring 11 is fixedly secured at both ends thereof in the flexed or curved state. Thus, the three-dimensional bulging or flexure can effectively be suppressed with generation of the discontinuous force being suppressed even around the neutral position even in the case where the machining precision is poor more or less. Besides, since no bent or folded portion exists in the scanning apparatus according to the instant embodiment of the invention, it can easily be manufactured in a simplified structure.

Incidentally, the deflector of the scanning apparatus 100 according to the instant embodiment of the present invention is constituted by the mirror 12 having a reflecting surface 12a for reflecting the laser beam 15. It should however be understood that the present invention is never restricted thereto. The deflector may be one designed for reflecting wave propagation such as electromagnetic wave, acoustic wave and others. By way of example, the deflector may be implemented as a parabolic antenna or the like. Further, the deflector may be one designed for refracting light beam such as a refraction grating, diffraction grating or the like.

Further, in the scanning apparatus according to the instant embodiment of the present invention, the piezoelectric element 14 is provided as the driving means. It should however be understood that the present invention is never restricted to the employment of the piezoelectric element either. By way of example, an electromagnet may be employed as in the case of the scanning apparatus described in the publication described hereinbefore in conjunction with related art.

Furthermore, in the case of the scanning apparatus according to the instant embodiment of the invention, the piezoelectric element 14 serving as the driving means is fixedly secured onto the plate spring 11 on one side or end portion thereof with reference to the mirror 12 so as to respectively change magnitude of the flexure of the one side portion of the plate spring 11 relative to the mirror 12. However, the driving means may be provided at both sides with reference to the mirror 12. In that case, the two driving means may be operated alternately or at deviated timings, respectively. In that case, the mirror 12 can equally be swingly or vibratorily rotated. In this conjunction, it is further noted that by providing the driving means at both sides, respectively, as mentioned above, magnitude of flexure or deflection can be rendered essentially uniform on both sides of the mirror 12, whereby positional deviation of the axis of rotation can be suppressed to a minimum while a large rotation or deflection angle of the mirror 12 can be realized.

Embodiment 2

Figure 2:
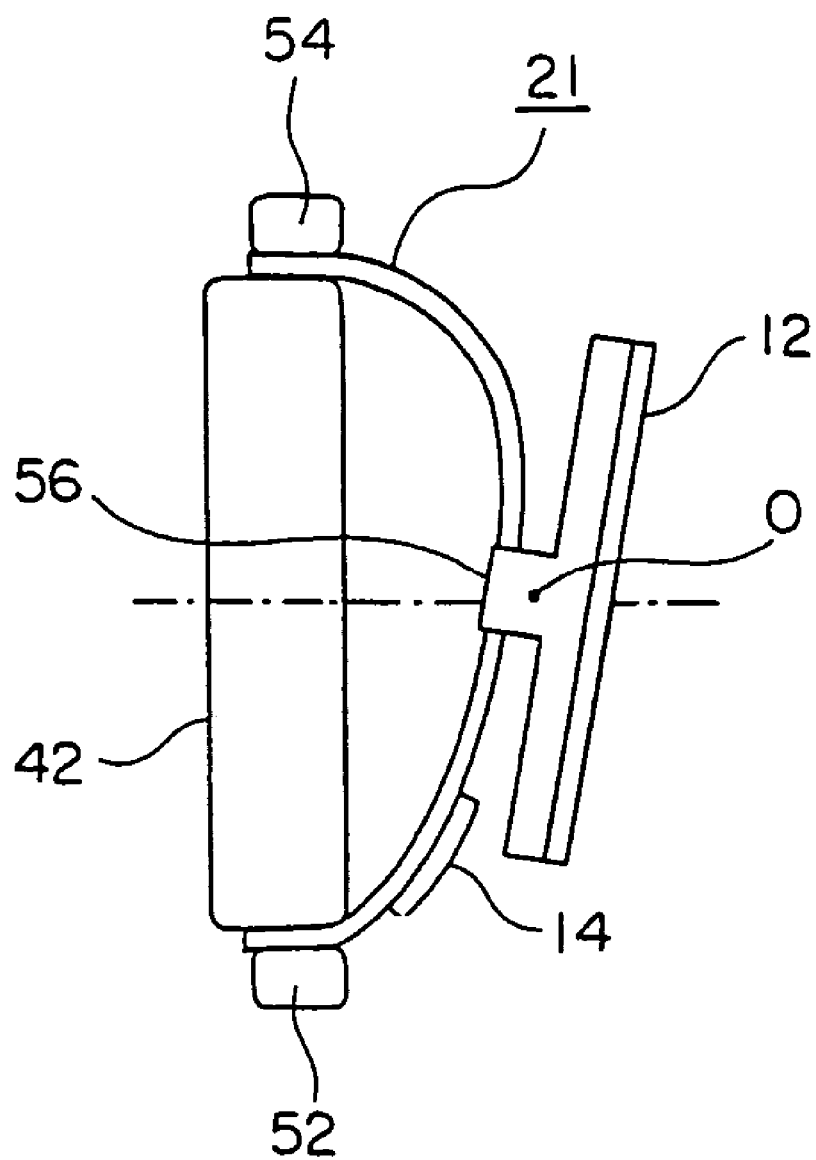
FIG. 2 is a side elevational view of a scanning apparatus according to a second embodiment of the present invention.

FIG. 2 is a side elevational view of a scanning apparatus according to a second embodiment of the present invention. In the scanning apparatus 200 according to the instant embodiment of the invention, a plate spring 21 is bent or curved convexly toward the mirror 12 as a whole without exhibiting any inflexion point. In the scanning apparatus 200 of the structure such as mentioned above, the structural rigidity is low when compared with the scanning apparatus according to the first embodiment in which the first and second inflection points E and F are formed, respectively, on both side portions of the mirror 12. As a consequence of this, a large rotational or deflection angle of the mirror 12 can be realized with a relatively small driving force.

On the other hand, because of the low structural rigidity, the force in the longitudinal direction or flexing direction of the plate spring 21 is rather feeble, disadvantageously in that detrimental vibration components are likely to be generated. By contrast, when the plate spring is so secured that the first and second inflection points E and F make appearance on both sides, respectively, of the mirror 12, as in the case of the scanning apparatus according to the first embodiment of the invention, with the distance of the center portion of the plate spring 11 from the holding member 42 being reduced by decreasing the sag or droop of the plate spring 11, a greater proportion of the force in the direction to move the mirror 12 in the longitudinal direction or flexing direction can be accommodated by a tensile stress or compressive stress of the plate spring 11 in the longitudinal direction, as a result of which very high structural rigidity can be ensured for the movement in the longitudinal direction or flexing direction. Thus, the detrimental vibration components in the longitudinal direction or flexing direction can be reduced.

Many modifications and variations of the present invention are possible in the light of the above techniques. It is therefore to be understood that within the scope of the appended claims, the invention may be practiced otherwise than as specifically described.

What is claimed is:

1. A scanning apparatus, comprising:
 a flat plate-like elastic member having both end portions fixedly secured in a state in which an intermediate portion of said elastic member is flexed arcuately;
 a deflector fixedly secured onto said elastic member at said intermediate portion thereof for changing a direction of a wave propagation coming from a predetermined direction; and
 driving means for reciprocatively rotating said deflector by changing repetitionally a magnitude of flexure of said elastic member relative to said deflector fixedly secured onto said elastic member.

2. A scanning apparatus according to claim 1,
 wherein said elastic member includes:
 first and second inflection points formed on both side portions, respectively, of said elastic member with reference to said deflector;

first and second flexure portions designed to flex in directions opposite to each other with reference to said first inflection point interposed between said first and second flexure portions; and third and fourth flexure portions designed to flex in directions opposite to each other with reference to said second inflection point interposed between said third and fourth flexure portions, and wherein said second and third flexure portions located near to said deflector extending from said first and second inflection points, respectively, are curved convexly toward said deflector, while said first and fourth flexure portions located near to said secured end portions extending from said first and second inflection points, respectively, are curved in a convex shape in a direction opposite to said deflector.

3. A scanning apparatus according to claim 1, wherein said elastic member is curved in a convex shape toward said deflector as a whole.

4. A scanning apparatus according to claim 1, further comprising:

a supporting member for supporting said deflector on said elastic member, wherein said supporting member supports said deflector with a predetermined distance outwardly from a center portion of said arcuate elastic member so that a center of reciprocative rotation of said deflector is positioned essentially at a center of gravity of an assembly composed of said supporting member and said deflector.

5. A scanning apparatus according to claim 1, wherein said driving means is driven at a vibration frequency which synchronizes with a resonance vibration of a system composed of said elastic member, said deflector and said supporting member.

6. A scanning apparatus according to claim 1, wherein said driving means is constituted by a piezoelectric element fixedly secured to said deflector.

7. A scanning apparatus according to claim 2, further comprising:

suppression means provided on outer sides of said first and fourth flexure portions of said elastic member for regulating so that flexing directions of said flexure portions are not reversed.

8. A wave scanning apparatus, comprising:

a flat plate-like elastic member having both end portions fixedly secured in a state in which an intermediate portion of said elastic member is flexed arcuately;

a deflector fixedly secured onto said elastic member at said intermediate portion thereof for changing a direction of a wave propagation coming from a predetermined direction; and driving means for reciprocatively rotating said deflector in order to scan said wave, by changing repetitionally a magnitude of flexure of said elastic member relative to said deflector fixedly secured onto said elastic member.

* * * * *